Dec. 26, 1967 N. E. POLSTER 3,360,799

X-Y RECORDER HAVING INTERCOUPLED CORD-PULLEY MEANS FOR INDEPENDENT X-Y DRIVES

Filed June 7, 1966 4 Sheets-Sheet 1

Dec. 26, 1967 N. E. POLSTER 3,360,799

X-Y RECORDER HAVING INTERCOUPLED CORD-PULLEY MEANS FOR INDEPENDENT X-Y DRIVES

Filed June 7, 1966

4 Sheets-Sheet 4

United States Patent Office 3,360,799

Patented Dec. 26, 1967

3,360,799

X-Y RECORDER HAVING INTERCOUPLED CORD-PULLEY MEANS FOR INDEPENDENTLY X-Y DRIVES

Norman E. Polster, Southampton, Pa., assignor to Leeds & Northrup Company, Philadelphia, Pa., a corporation of Pennsylvania Filed June 7, 1966, Ser. No. 555,725
8 Claims. (Cl. 346—29)

This invention relates to recorders, and particularly to X-Y recorders in which a marker element is movable both along and transversely of the chart.

Various arrangements have heretofore been proposed in which motion of a marker element linearly of its movable support or guide and motion of such support or guide along the chart have been effected by fixedly-mounted drive motors. In some of these prior arrangements, the motions of the pen and its movable guide are so interrelated that expensive, precisely-machined differential mechanism is required to obtain motion of the pen in only one of its coordinated directions; other arrangements, having relatively heavy guide structure for the pen, include in the drive a splined shaft and flexible coupling means conducive both to backlash errors and slow recording speed: also, many of such arrangements apply the driving forces in manner tending to bind the pen and/or its movable support.

In accordance with the present invention, there is provided a first guide structure and a second guide structure supported thereby and movable therealong to guide a marking element in the X and Y directions. Motor means are provided for the X and Y drives which consist solely of pulley and cable means without inclusion of any differential gearing, splined shafts or the like. There is provided a floating link coupling between the drives which, by concurrently moving in a direction opposite to the movable guide for the pen and at half the distance, attains independence between the coordinate motions of the recorder-pen or other marker. The X, Y drives as coupled by such floating link are free of backlash, and they contribute only slightly to the inertia of the pen/pen guide system and do not impose binding or frictional forces upon it.

For a more detailed understanding of the invention, reference is made to the following description of preferred forms thereof and to the accompanying drawings in which.

Figures 1, 1A, 1B, 1C:
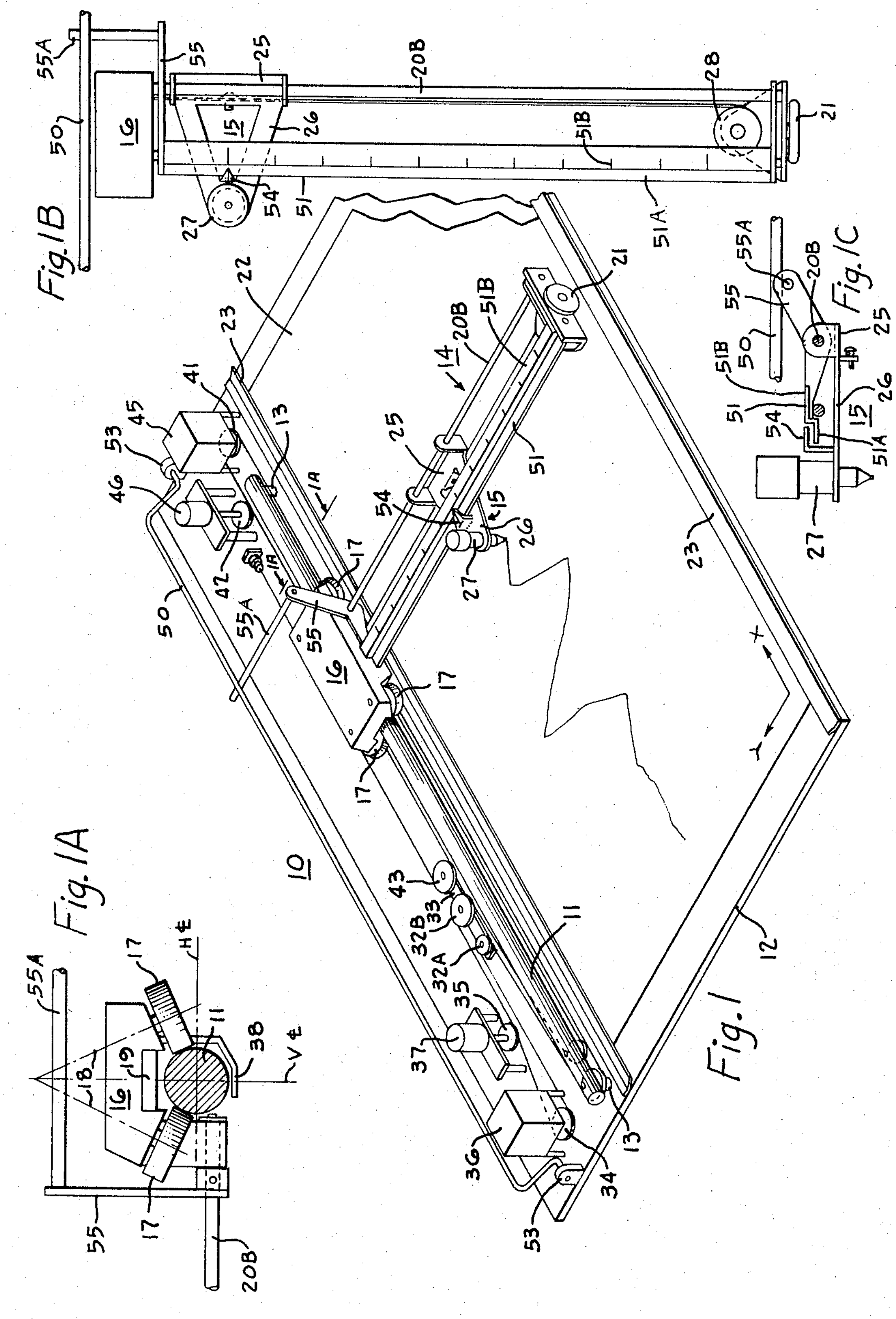
FIG. 1 is a perspective view of a table top X-Y recorder embodying the invention.
FIGS. 1A, 1B and 1C are detail views referred to in discussion of FIG. 1.
Figure 2A:
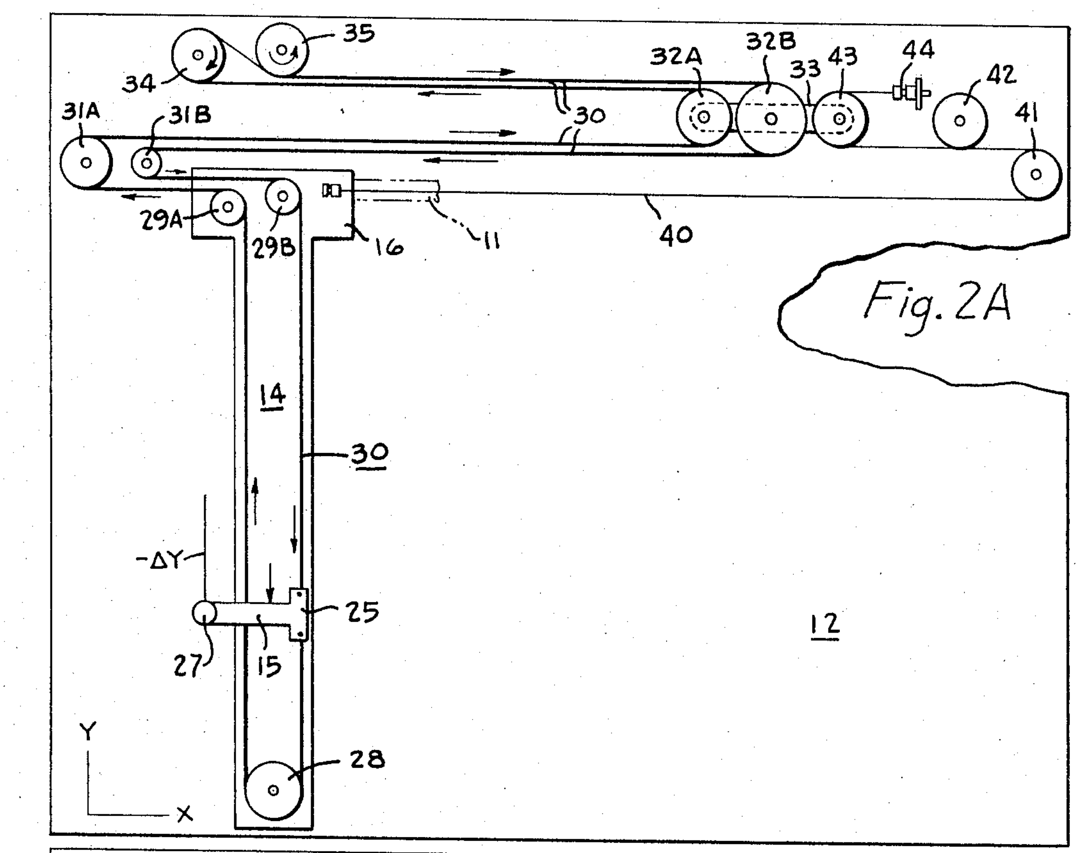
Figures 2B, 2C:
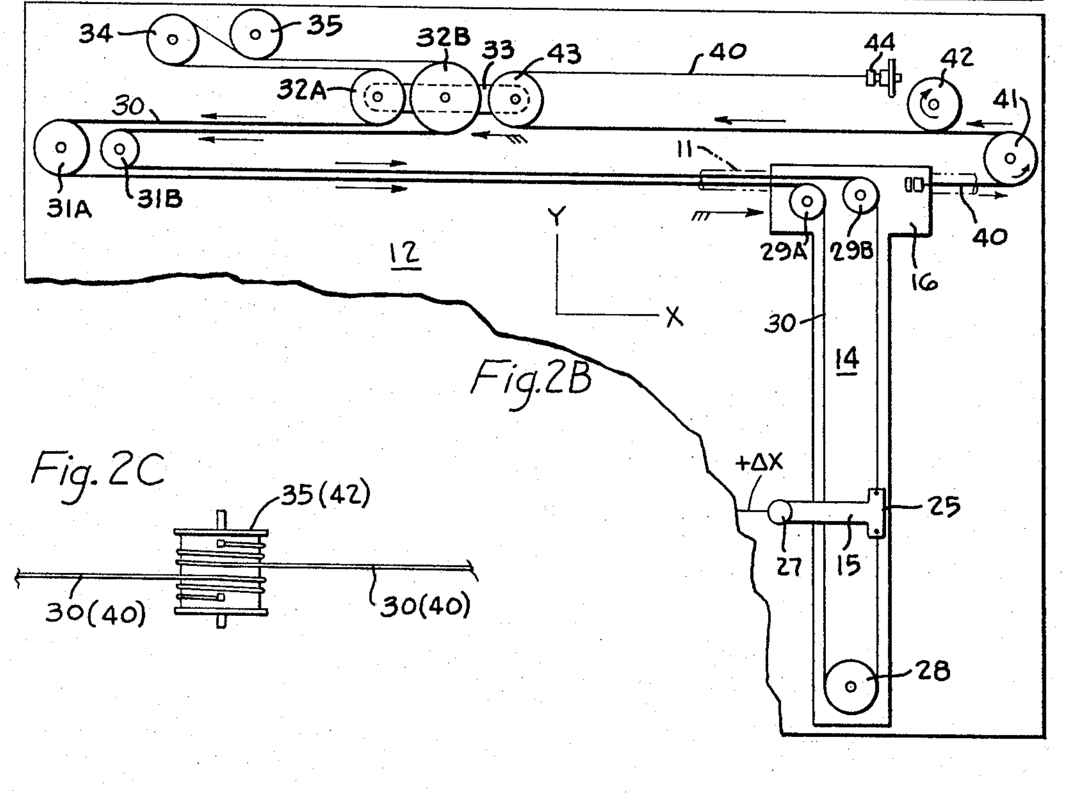
Figure 3:
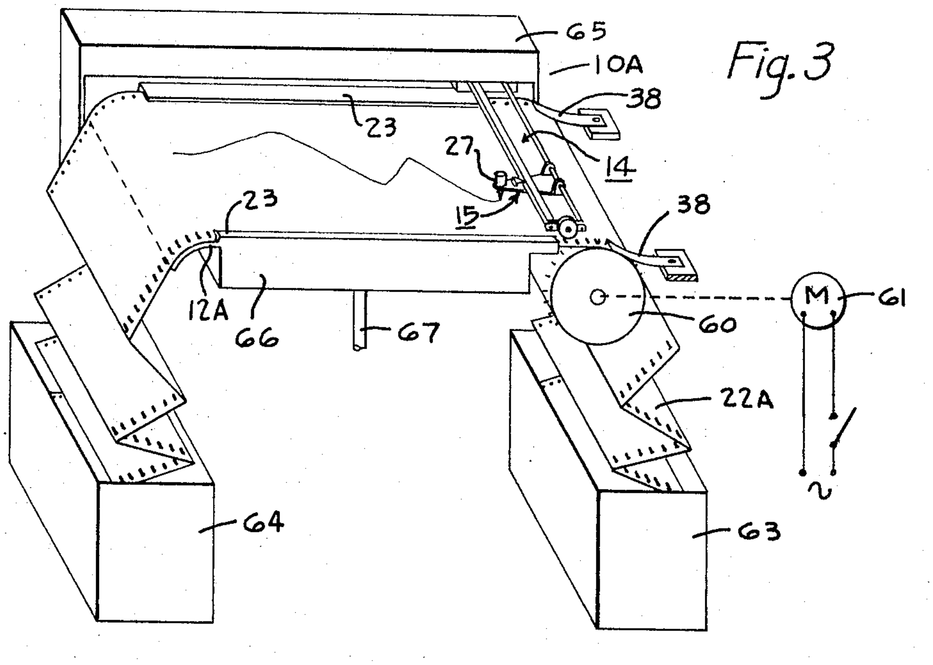
Figure 4:
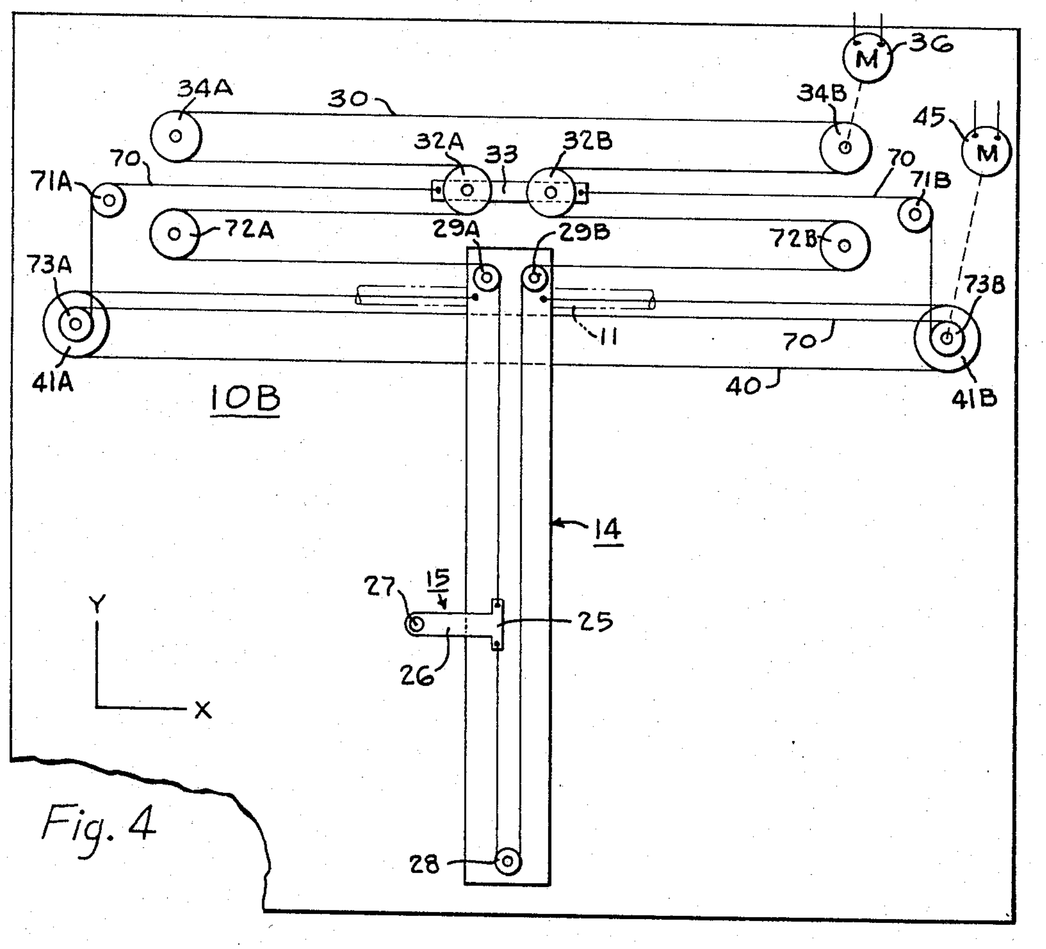
Figure 5:
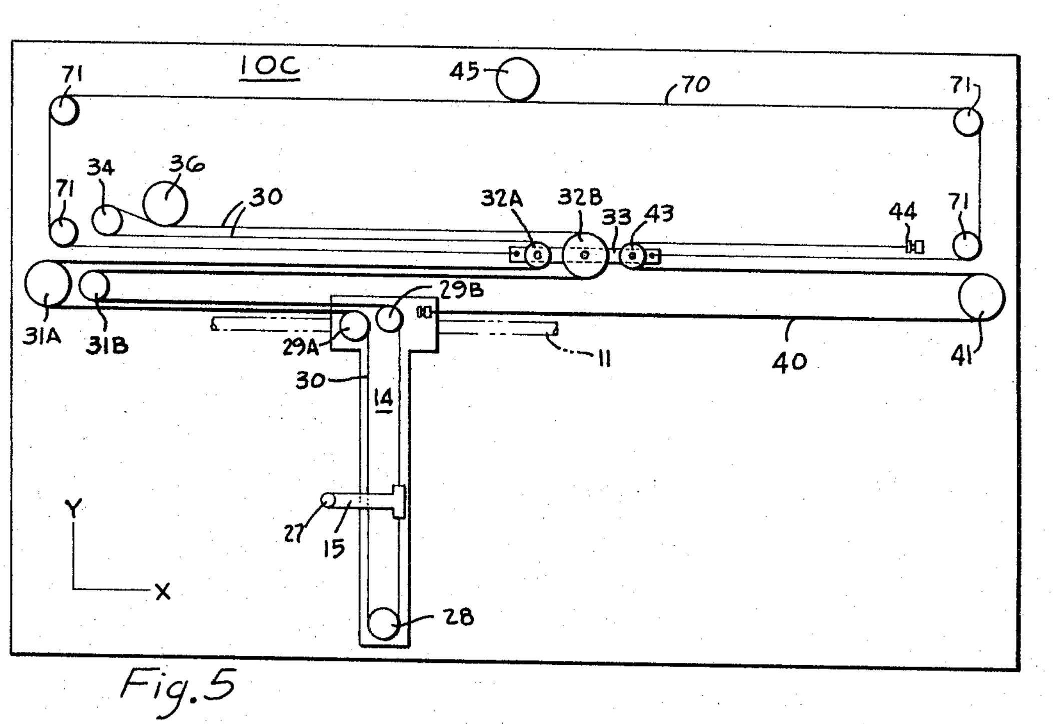
Figure 6:
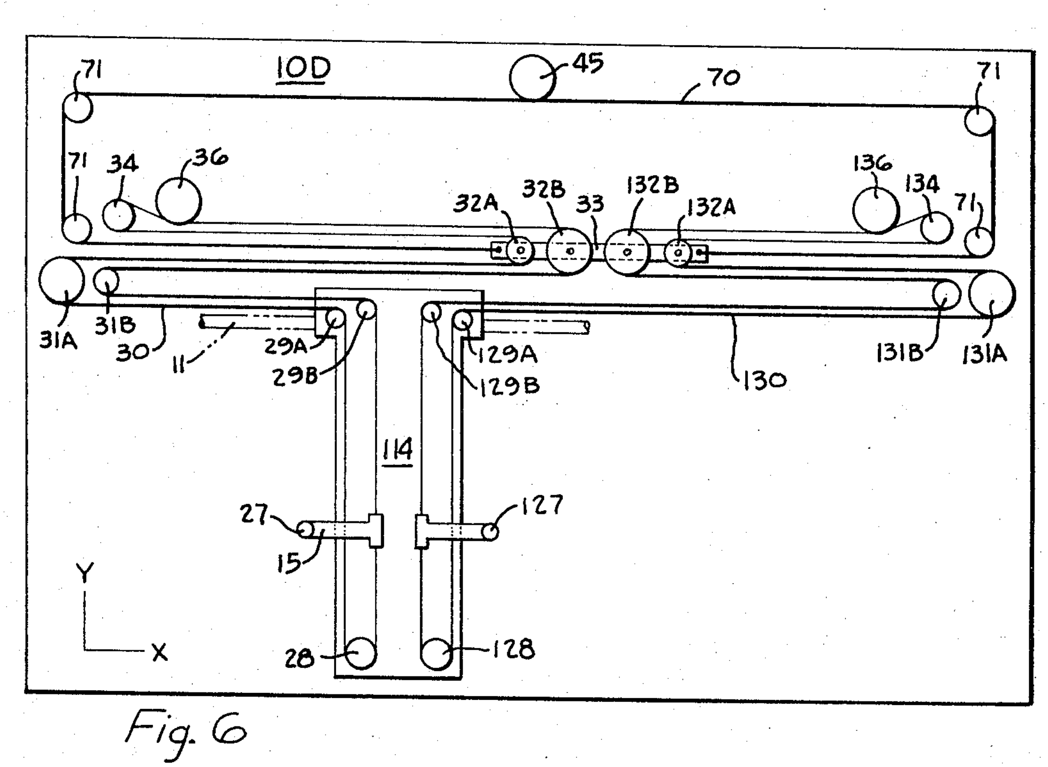

FIGS. 2A and 2B diagrammatically illustrate the X-Y drive systems of FIG. 1 and are referred to in discussion of the operation of the respective drives;

FIG. 2C is a plan view of a cable drum similar to that utilized in FIGS. 1, 2A and 2B;

FIG. 3 is a perspective view of a recorder similar to FIG. 1 suited for use with a strip chart;

FIGS. 4 and 5 diagrammatically illustrate other forms of X-Y drive systems using pulleys and cables coupled by a floating link; and FIG. 6 diagrammatically illustrates an X-Y-Y or two-pen recorder using pulleys and cables coupled by a floating link.

Referring to FIGS. 1 and 1A, the stationary guide structure 11, preferably a single straight metal rod of circular cross-section, is supported from the base member or plate 12 of recorder 10 by the posts or spacers 13. The movable guide structure 14 for the marker assembly 15 is of light T-frame construction, preferably with a diagonal brace which has been omitted for simplification, with a head or carriage section 16 having a pair of wheels 17, 17 at each end for low-friction rolling support by the stationary guide 11. As best shown in FIG. 1A, the axes of rotation 18 of wheels 17 are so inclined that the wheel peripheries are tangent to the surface of the stationary guide rod 11 somewhat above its horizontal center-line. Each pair of axes intersects the vertical center-line of rod 11 at a point above the rod. At its outboard end, the movable T-frame 14 is provided with wheel 21 for low-friction rolling support by base member 12 or other backing member for the recorder chart 22.

The movable guide 14 is biased for continuous engagement with the fixed guide structure 11 by its weight. When the apparatus is to be used in vertical position, or more usually nearly so, such bias may be supplemented, as shown in FIG. 1A, by the magnetic attraction between a permanent magnet 19, attached to the carriage section 16 of the movable guide 14, and the stationary guide 11. A clip 38 may be attached to head section 16 to prevent its dislodgment. The entire T-guide structure 14 may be swung upwardly and away from base 12 with guide 11 as its pivotal axis to facilitate insertion or removal of a recorder chart.

The marker assembly 15 is slidably supported by rod 20B of the movable guide structure 14 for movement along it at a fixed angle, for example, at right angles to the stationary guide structure 11. In the preferred construction shown in side elevation in FIG. 1C, assembly 15 is also of light construction, and its head section 25 slidably and pivotally engages rod 20B. At its outboard end, the pen arm 26 releasably, slidably supports the pen 27, or equivalent marker element, which normally rests on chart 22 as held flat on base 12 by the edge-guide or clamping strips 23, 23.

Preferably, there is provided a means for lifting the marker 27 from the chart for any position of the marker along the movable guide 14 and for any position of guide 14 along the stationary guide 11. Specifically and as best shown in FIG. 1C, such pen-lifting means comprises a light bail member 51 pivotally supported by rod 20B at or near its opposite ends. A stepped section 51A of bail member 51 extends below a hook 54 on the pen-support arm 26. Preferably and as shown, this hook is in the form of a pointer and cooperates with scale 51B extending along and forming part of or attached to the bail member 51.

The end of bail member 51 nearest the guide 11 is in the form of a bell crank 55. The crank-pin 55A extends below a second bail member 50 which is pivotally supported by stationary bearings 53, 53 for angular movement about an axis which is parallel, or substantially so, to the stationary guide 11. Normally, the bail member 50 is biased out of engagement with crank-pin 55A of bail member 51, but when rocked by any suitable means, it engages crank-pin 55A and rotates the bail member 51 to lift the pen 27 wherever it may be positioned in the X-Y plane. There is thus avoided any undesired markings on the chart 22.

Motion of the pen in the Y direction, i.e., along its movable guide 14, is derived via a pulley-cable means or system driven by a reversible motor 36 which may be the balancing motor of a self-balancing measuring system. The motor is mounted in fixed position on the recorder base 12 and drives pulley 34. As shown in FIGS. 2A, 2B, the Y drive cable 30 from pulley 34 and a drum 35 passes over movable pulleys 32A, 32B carried by a floating link 33; pulleys 31A, 31B located in fixed position adjacent one limit of travel of the movable pen-guide structure 14; and pulleys 28, 29A, 29B carried by the pen-guide structure 14. The pen assembly head 25 is attached at a fixed point or points in the span of cable 30 as extending from inboard pulley 29B over the outboard pulley 28. The cable 30, as extending from the floating-link pulleys 32A, 32B, is looped over fixed pulley 34 and drum 35. Preferably, and as shown (FIG. 2C), the cable line from floating-link pulley 32B is wound around drum 35 with its end anchored to the drum 35, and the cable line from pulley 34 is wound around drum 35 with its end anchored to the drum near the opposite end thereof. The total length of cable 30 wound on drum 35 is not less than the desired Y travel of pen 27. The Y drive motor 36 is shown connected (FIG. 1) for direct drive of the fixed pulley 34 but, alternatively, it may be connected directly to drive the fixed-axis drum 35. A conventional multi-turn potentiometer 37 for use in a self-balancing measuring system is connected to the shaft of drum 35. Alternatively, a straight slidewire (not shown) may be disposed along base 12 for sliding engagement therewith by a movable contact attached to one of the lines of cable 30 as extending from floating pulley 32A or 32B, thereby eliminating the need for positively driven drum 35 which can be replaced by a pulley. In this latter arrangement, the grooves of the pulleys can all be in the same plane, thus permitting use of a flexible metal tape instead of cable.

When only the Y motor 36 is energized, the floating link 33 and movable guide 14 remain stationary in space. The existent complete configuration of cable 30 as a whole also remains unchanged, but the cable circulates with each point on its lines moving in direction and to extent dependent upon the sense and magnitude of unbalance of the measuring system controlling operation of the Y motor. Assuming, for example, that motor 36 is driving pulley 34 in clockwise direction (FIG. 2A), the various lines of cable 30 move in the indicated directions and pen 27 draws a $-\Delta Y$ trace toward the outer edge of the chart. When motor 36 is energized in reverse direction, the cable 30 circulates in reverse direction without change of configuration and pen 27 draws a $+\Delta Y$ trace.

Motion of pen 27 in the X direction, i.e., parallel to the stationary guide structure 11, is derived, via a second pulley-cable means or system, from reversible motor 45 (FIG. 1), which is also mounted in fixed position on recorder base 12. As best shown in FIGS. 2A, 2B, the X drive cable 40 is fastened at one end to the head 16 of movable guide 14. From there, cable 40 passes over pulley 41 rotatable about a fixed axis adjacent the other limit of travel of the pen-guide structure 14; over drum 42 also rotatable on a fixed axis; over pulley 43 carried by the floating link 33; and has its other end fastened to the adjustable tensioning device 44. As shown, the tensioning device 44 may comprise a post which is attached to the base plate 12, and preferably receives a cable-tensioning screw.

Preferably and as shown (FIG. 2C), the cable line from floating pulley 43 is wound around drum 42 with an end anchored to the drum near one face thereof, and the cable line from pulley 41 is also wound around the drum 42 with an end anchored to the drum near the other face thereof. The total length of cable 40 wound on drum 42 is not less than the desired X travel of pen 27 and movable guide 14. The X drive motor 45 may be connected (FIG. 1) for direct drive of fixed pulley 41 but, alternatively, it may be connected to drive the pulley or drum 42. A multi-turn potentiometer 46 for use in a self-balancing measuring system may, as shown, be connected to the shaft of drum 42. Alternatively, a straight slidewire (not shown) may be disposed below the path of travel of head 16 of the movable guide 14 so that it will be engaged by a contact mounted on head 16. In this latter arrangement, the grooves of the pulleys can all be in the same plane, thus permitting use of a flexible metal tape instead of cable.

When only the X motor 45 is energized, the marker assembly 15 remains stationary with respect to its movable guide 14, but the latter moves along the stationary guide 11 in a direction dependent upon the direction of rotation of motor 45 and drive pulley 41. As indicated in FIG. 2B, the effective cable drive loop which circulates for the X drive in either direction comprises portions of both cable systems and includes a single line of cable 40 (attached to head 16 of guide structure 14 and extending therefrom over fixed pulley 41 to floating pulley 43); the floating link 33; and the dual lines of cable 30 which extend from the floating pulleys 32A, 32B over stationary pulleys 31A, 31B to the pulleys 29A, 29B on the head 16. During motion of the guide 14, the floating link 33 and its pulleys 32A, 32B, 43, or equivalent structure, move in the opposite direction and move only half the distance of guide 14 due to the fact that the parallel pairs of lines from the floating pulleys lengthen and shorten respectively. In consequence, the pairs of lines of cable 30 from the floating link 33 supply the amount of cable to pulleys 31A, 31B necessary to permit the pair of lines from pulleys 31A and 31B to pulleys 29A and 29B mounted on the movable guide 14 to change equally in length by the same amount that the line 40 from head 16 to pulley 41 is shortened, and consequently there is no circulation of these lines with respect to each other which would cause undesired Y motion of pen 27.

With the two lines of Y-motion cable 30 extending in the same direction from the movable guide structure 14, the sum of their tensions is maintained equal to the tension of the line of X-motion cable 40 extending in opposite direction from the guide structure 14. Specifically, when the Y-motor 36 operates to move the marker 27 along the guide structure 14, the tension on one of the Y cable lines to the structure 14 increases, but the tension on the other Y line to that structure decreases by like amount, the sum of such tensions equaling the constant tension on the X cable line from movable structure 14. In consequence, there is no spurious $\Delta X$ movement of the pen-guide structure 14 because of operation of Y-motor 36.

Also, when the X-motor operates to move the pen-guide structure 14 parallel to the fixed guide structure 11, the change in tension of the X cable line to movable structure 14 is divided equally between the Y cable lines to movable structure 14 so that there is no tendency for the Y cable to circulate and produce a spurious $\Delta Y$ movement of marker 27.

When both motors 36 and 45 are concurrently energized, the X and Y motions of the marker are wholly independent of each other, each responding solely to its own drive motor.

As shown, the cable lines as extending to the movable guide structure 14 are all substantially parallel to each other and to the stationary structure 11; also, all cable lines, as extending to the floating link 33, are substantially parallel to each other. The lines of cables 30, 40, as extending from guide 14 to the fixed pulleys 31A, 31B, 41, are in the same plane and the point of attachment of cable line 40 to guide 14 is centered with respect to lines 30 to avoid any force moment tending to twist, bind or lift the head 16 of the movable marker guide 14. The single tensioning device 44 provides for adjustment of the tension in all lines of cables 30, 40.

With the above-described cable drive arrangement, the moving masses can be minimized to extent consistent with mechanical rigidity for high-speed accurate recording, and there is avoided use of precisely-machined expensive components, such as differential gearing, splined shafts, or the like, having backlash initially, or with wear, and either requiring replacement or provision of anti-backlash devices.

In the modification shown in FIG. 3, the cover or housing 65 of recorder 10A encloses most of the cable-pulley systems and their drive motors. The concealed pulley drive systems may be the same as in the preceding figures or as in subsequently described modifications. A motor-driven feed roll 60 is added for feed of a strip chart 22A. For use of recorder 10A as an X–Y recorder, the feed drive motor 61 may be energized briefly after completion of one X–Y record to advance the chart a small increment or feed the corresponding used increment of strip chart 22A into the storage bin 64 and to feed the next unused increment or length of chart from the supply bin 63. For use as a Y/time recorder, the feed motor 61 is continuously energized to move the strip chart 22A at desired constant speed in either direction: the X motor is not energized for this mode of recording. Pressure plates or springs 38 engage the paper chart adjacent the feed-roll pins. Strips 23 are used in this modification simply as guides and not as hold-down clamps. To hold the chart flat beneath the marker 27 when the chart is stationary for X–Y recording, the baseplate 12A may have an apertured or mesh section forming the top of a suction box 66 or may be electrostatically charged by means not shown.

In the modification schematically shown in FIG. 4, the components of recorder 10B which correspond with those of recorder 10 (FIG. 1) are identified by the same reference characters. In recorder 10B, the X drive cable 40 passes over the idler pulleys 41A, 41B rotatable about fixed axes adjacent the opposite X limits of travel of the movable guide 14. The opposite ends of this loop of cable 40 are attached to the guide 14 so to effect X motion of the marker 27 when the X drive motor 45 is energized. This motor may be directly coupled to either of the pulleys 41A, 41B. The Y drive cable 30 for the marker 27 also forms a closed loop. It is attached to the head section 25 of the marker assembly 15 and passes from the outboard pulley 28 over the pair of inboard pulleys 29A, 29B. The Y cable line from movable pulley 29A passes in sequence over the stationary axis pulley 72A, pulley 32A carried by the floating link 33, and fixed axis pulley 34A. Similarly, the Y cable line from pulley 29B on movable guide 14 passes in sequence over the fixed axis pulley 72B, pulley 32B of floating link 33 and fixed axis pulley 34B. Consequently, when motor 36 is energized, all points of cable 34 circulate to effect Y motion of the pen.

However, in FIG. 4 as thus far described, the floating link 33 has no predetermined position or relationship. In consequence, when marker guide 14 is moved by energization of the X motor, there could be undesired and indeterminate motion of the marker in a Y direction. To preclude such undesired Y-motion, this modification required a third cable 70 as part of the X drive means; it is attached to the floating link 33 and passes over the fixed axis idler pulleys 71A, 71B to the second pair of fixed axis pulleys 73A, 73B. The pulleys 73A, 73B are respectively part of or directly coupled to pulleys 41A, 41B and are precisely of half the diameter thereof, with the cable lines reversed to effect motion of floating link 33 in direction opposite to marker guide 14 and at half the distance and speed for the same purpose as in FIG. 1. Such motion of the floating link occurs because as the movable guide 14 moves to the right upon operation of motor 45 in a clockwise direction, the line of cable 30 from pulley 29B to pulley 72B gets shorter by the same amount that the guide 14 moves. The line of cable 70 from pulley 71B to floating link 33 will get longer by half the amount allowing the floating link to move to the left to circulate cable 70. As will be evident, the parallel pairs of lines of cable 30 between the floating pulleys 32A, 32B and fixed pulleys 72A, 72B, 34A and 34B will get longer and shorter respectively to maintain a fixed relationship between pen 27 and its drive pulley 34B. In recorder 10 of FIG. 1, the desired 1 to 2 coupling between the X and Y drives is obtained without need for the additional cable 70 and for precisely dimensioned pulleys 73A, 73B. However, like recorder 10, the recorder 10B provides an X–Y recorder having low inertia with consequent high speed of response and also having X–Y motions respectively requiring energization of only a single motor.

In the modifications schematically shown in FIG. 5, the components of recorder 10C which correspond with those of recorder 10 (FIG. 1) are identified by the same reference characters. In recorder 10C, the drive for the marker 27 is the same as in recorder 10, and, consequently, it is not necessary to repeat the description thereof. The coupling between the X and Y drive via the floating link 33 to effect motion of the floating link 33 concurrently with movable guide 14 but for only half the distance for X motion of the marker 27 is similar to that of recorder 10 in that the X cable 40 has two lines to the floating-link pulley 43 and that the Y cable 30 has four lines to the floating-link pulley pair 32A, 32B at the opposite end of link 33. Like recorder 10B (FIG. 4), it utilizes a third cable as part of the X drive for driving the floating link 33 from motor 45 through half the distance moved by marker guide 14 and in opposite direction. Unlike recorder 10B, recorder 10C does not require any critical relationship between pulley diameters.

In the X–$Y_1$–$Y_2$, or two-pen, recorder 10D shown in FIG. 6, the pulley cable system or means for effecting the Y motion of each of pens 27, 127, with respect to their common movable guide structure 114, is the same as in recorder 10 (FIG. 1) and recorder 10C (FIG. 5). It is to be noted that the Y drive for pen 127, including cable 130 and pulleys 134, 132A, 132B, 131A, 131B, 129A, 129B and 128, is a reversed or mirror image of the Y drive for pen 27. In consequence, the oppositely extending lines of cables 30, 130 respectively as coupled by the floating link 33 and the movable guide 114 form a system to which an X drive can be attached as in FIG. 5. When the X motor 45 is energized to move the floating link 33 via cable 70, the dual movable guide 114 moves in an opposite direction and through twice the distance. As in all modifications, the cable lines extending to the movable guide structure are all substantially parallel to each other and to the stationary guide structure, and all cable lines extending to the floating link are substantially parallel to each other. The two-pen recorder 10C is per se not herein specifically claimed, but so far as the common subject matter is concerned, is herein generically claimed.

As will be evident, multi-turn or straight slidewires can be used in various combinations with any of the recorders described. Other follow-up devices employed in the recorder art and other known recorder features may likewise be used.

It will be understood the invention is not limited to the specific arrangements disclosed, but also comprehends equivalents thereof, and that the various recorders may also be used as transmitters.

What is claimed:

1. A two-coordinate recorder comprising a first guide-structure stationarily mounted on a base structure, a second guide-structure supported by and movable along said first, stationary guide-structure, a marker element supported for linear movement along said second guide-structure at a fixed angle to said first guide-structure, first and second reversible drive means located at fixed locations with respect to said first guide-structure, a first cable-pulley means for coupling the first drive means to said marker element to effect its motion along said second guide-structure, a second cable-pulley means for coupling the second drive means to said second guide-structure to effect motion thereof along said first guide-structure and so effect linear motion of said marker element parallel to said first guide-structure, and means for interconnecting yet effectively isolating said first and second cable-pulley means to obtain motion of said marker element along the second guide structure only by said first drive means and motion of said marker element parallel to said first guide-structure only by said second drive means, said interconnecting means including a floating link which for coordinate motion of said marker element with respect to said first guide-structure moves in direction opposite to the direction of movement of said second guide-structure for half the distance.

2. A two-coordinate recorder system as in claim 1 including a single tensioning device directly connected to one of said cable means and effective through said floating link to tension all cable lines.

3. A two-coordinate recorder system as in claim 2 in which the tensioning device is at a point fixed relative to said base structure.

4. A two-coordinate recorder system as in claim 1 in which at least one line of the second cable means is effectively attached to said second guide-structure to effect, through increased tension in said cable adjacent said point of attachment, its motion in one direction and in which motion of said second guide-structure in opposite direction is effected from an increase in tension in lines of the second cable means from said second drive means, through said floating link and lines of said first cable means to said second guide-structure.

5. A two-coordinate recorder as in claim 1 in which the cable lines as extending to the movable guide-structure are all substantially parallel to each other and to said stationary guide-structure and all cable lines extending to said floating link are substantially parallel to each other.

6. A two-coordinate recorder as in claim 5 in which the centers of the grooves of all pulleys of the cable-pulley means are in a common plane.

7. A two-coordinate recorder as in claim 1 in which the lines of said first cable means extend from said second guide-structure in the same direction and the sum of their tensions is maintained equal to the tension of the line of the second cable means which extends in opposite direction from said second guide-structure so to prevent undesired motion of the second guide-structure along said first guide-structure because of motion of said first drive means and also to prevent undesired motion of said marker element along said second guide structure because of motion of said second drive means.

8. A two-coordinate recorder comprising a first guide-structure stationarily mounted on a base structure, a second guide-structure supported by and movable along said first, stationary guide-structure, a marker element supported for linear movement along said second guide-structure at a fixed angle to said first guide-structure, first and second drive means located at fixed locations with respect to said first guide-structure, a first cable-pulley means for coupling said first drive means to said marker element to effect its motion along said second guide-structure, floating link means, a second cable-pulley means coupled to said first cable-pulley means through said floating link means to effect a complete drive connection between said second drive means and said second guide-structure to effect motion of said second guide-structure along said first guide-structure and so effect linear motion of said marker element parallel to said first guide-structure, and means comprising a portion of said floating link means engaging opposed cable loops to provide lengthening and shortening and corresponding shortening and lengthening of said opposed cable loops in at least one of the cables of said first and second cable-pulley means for the production of independent movement of said marker element by either of said two drive means.

References Cited

UNITED STATES PATENTS

| | | | |
|---|---|---|---|
| 2,785,941 | 3/1957 | Macklem et al. | 346—29 X |
| 3,205,504 | 9/1965 | Nishimura et al. | 346—139 |

RICHARD B. WILKINSON, *Primary Examiner.*

J. W. HARTARY, *Assistant Examiner.*